United States Patent
Anderson-Sprecher et al.

(10) Patent No.: US 9,240,070 B2
(45) Date of Patent: Jan. 19, 2016

(54) METHODS AND SYSTEMS FOR VIEWING DYNAMIC HIGH-RESOLUTION 3D IMAGERY OVER A NETWORK

(71) Applicant: Google Inc., Mountain View, CA (US)

(72) Inventors: Peter Elving Anderson-Sprecher, Los Altos Hills, CA (US); Chaitanya Gharpure, Santa Clara, CA (US); Anthony Gerald Francis, Jr., San Jose, CA (US); James Joseph Kuffner, Jr., Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 141 days.

(21) Appl. No.: 14/100,290

(22) Filed: Dec. 9, 2013

(65) Prior Publication Data
US 2015/0161823 A1    Jun. 11, 2015

(51) Int. Cl.
*G06T 15/00*    (2011.01)

(52) U.S. Cl.
CPC ........... *G06T 15/005* (2013.01); *G06T 2200/16* (2013.01)

(58) Field of Classification Search
CPC ................ H04N 1/00458; H04N 2201/212; H04N 5/23245; H04N 1/00161; Y10S 707/99933; G06T 19/003
See application file for complete search history.

(56) References Cited

U.S. PATENT DOCUMENTS

| | | | |
|---|---|---|---|
| 2002/0180879 A1* | 12/2002 | Shiohara | 348/333.05 |
| 2002/0194589 A1* | 12/2002 | Cristofalo et al. | 725/32 |
| 2009/0215477 A1* | 8/2009 | Lee et al. | 455/466 |
| 2011/0312278 A1* | 12/2011 | Matsushita et al. | 455/66.1 |
| 2013/0031589 A1* | 1/2013 | Casanova et al. | 725/93 |
| 2013/0246917 A1* | 9/2013 | Carne | 715/716 |

OTHER PUBLICATIONS

Jason Holt, Swivel Viewer, an open source embeddable album viewer, Jul. 29, 2010, downloaded from http://google-opensource.blogspot.com/2010/07/swivel-viewer-open-source-embeddable.html on Jun. 27, 2015.*

* cited by examiner

*Primary Examiner* — Haixia Du
(74) *Attorney, Agent, or Firm* — McDonnell Boehnen Hulbert & Berghoff LLP

(57) ABSTRACT

An example method may involve a computing device receiving low-resolution images of an object and high-resolution images of the object. The method may also involve causing a 3D image viewer to display a first high-resolution image of the object. The method may further involve receiving an input associated with adjusting a view of the object in the 3D image viewer. The method may still further involve, based on the input, causing the 3D image viewer to sequentially display at least a portion of the low-resolution images so as to adjust the view of the object in the 3D image viewer. The method may yet still further involve, in response to a completion of the sequential display, causing the 3D image viewer to display a second high-resolution image of the object that corresponds to a respective low-resolution image of the object displayed at the completion of the sequential display.

18 Claims, 9 Drawing Sheets

Computer Program Product 700

Signal Bearing Medium 701

Program Instructions 702

- receiving a plurality of low-resolution images of an object and a plurality of high-resolution images of the object, where the plurality of low-resolution images and the plurality of high-resolution images are indexed such that a respective low-resolution image of the object corresponds to a respective high-resolution image of the object

- causing a 3D image viewer to display a first high-resolution image of the object from the plurality of high-resolution images

- receiving an input associated with adjusting a view of the object in the 3D image viewer

- based on the input, causing the 3D image viewer to sequentially display at least a portion of the plurality of low-resolution images of the object so as to adjust the view of the object in the 3D image viewer

- in response to a completion of the sequential display, causing the 3D image viewer to display a second high-resolution image of the object that corresponds to a respective low-resolution image displayed at the completion of the sequential display

| Computer Readable Medium 703 | Computer Recordable Medium 704 | Communications Medium 705 |

FIGURE 7

METHODS AND SYSTEMS FOR VIEWING DYNAMIC HIGH-RESOLUTION 3D IMAGERY OVER A NETWORK

BACKGROUND

In computer graphics, three-dimensional (3D) modeling involves generation of a representation of a 3D surface of an object. The representation may be referred to as a 3D object data model, and can be rendered or displayed as a two-dimensional (2D) image via 3D rendering or displayed as a 3D image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or by scanning objects, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g. the boundary) of the object. Because an appearance of an object depends largely on an exterior of the object, boundary representations are common in computer graphics.

3D models are used in a wide variety of fields, and may be rendered and displayed using a number of different types of interfaces. Example interfaces may provide functionality to enable interaction between a user and the 3D models.

SUMMARY

In one aspect, a method is provided that involves receiving, at a computing device, a plurality of low-resolution images of an object and a plurality of high-resolution images of the object, where the plurality of low-resolution images and the plurality of high-resolution images are indexed such that a respective low-resolution image of the object corresponds to a respective high-resolution image of the object. The method may also involve causing a 3D image viewer to display a first high-resolution image of the object from the plurality of high-resolution images. The method may further involve receiving an input associated with adjusting a view of the object in the 3D image viewer. The method may still further involve based on the input, causing the 3D image viewer to sequentially display at least a portion of the plurality of low-resolution images of the object so as to adjust the view of the object in the 3D image viewer. The method may yet still further involve, in response to a completion of the sequential display, causing the 3D image viewer to display a second high-resolution image of the object that corresponds to a respective low-resolution image displayed at the completion of the sequential display.

In another aspect, a non-transitory computer-readable medium having stored therein instructions, that when executed by a computing device, cause the computing device to perform functions is provided. The functions may include receiving a plurality of low-resolution images of an object and a plurality of high-resolution images of the object, where the plurality of low-resolution images and the plurality of high-resolution images are indexed such that a respective low-resolution image of the object corresponds to a respective high-resolution image of the object. The functions may also include causing a 3D image viewer to display a first high-resolution image of the object from the plurality of high-resolution images. The functions may further include receiving an input associated with adjusting a view of the object in the 3D image viewer. The functions may still further include, based on the input, causing the 3D image viewer to sequentially display at least a portion of the plurality of low-resolution images of the object so as to adjust the view of the object in the 3D image viewer. The functions may yet still further include, in response to a completion of the sequential display, causing the 3D image viewer to display a second high-resolution image of the object that corresponds to a respective low-resolution image displayed at the completion of the sequential display In yet another aspect, a system is provided that includes at least one processor, and data storage comprising instructions executable by the at least one processor to cause the system to perform functions. The functions may include receiving a plurality of low-resolution images of an object and a plurality of high-resolution images of the object, where the plurality of low-resolution images and the plurality of high-resolution images are indexed such that a respective low-resolution image of the object corresponds to a respective high-resolution image of the object. The functions may also include causing a 3D image viewer to display a first high-resolution image of the object from the plurality of high-resolution images. The functions may further include receiving an input associated with adjusting a view of the object in the 3D image viewer. The functions may still further include, based on the input, causing the 3D image viewer to sequentially display at least a portion of the plurality of low-resolution images of the object so as to adjust the view of the object in the 3D image viewer. The functions may yet still further include, in response to a completion of the sequential display, causing the 3D image viewer to display a second high-resolution image of the object that corresponds to a respective low-resolution image displayed at the completion of the sequential display The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 7 is a schematic illustrating a conceptual partial view of an example computer program product that includes a computer program for executing a computer process on a

DETAILED DESCRIPTION

Figure 1:
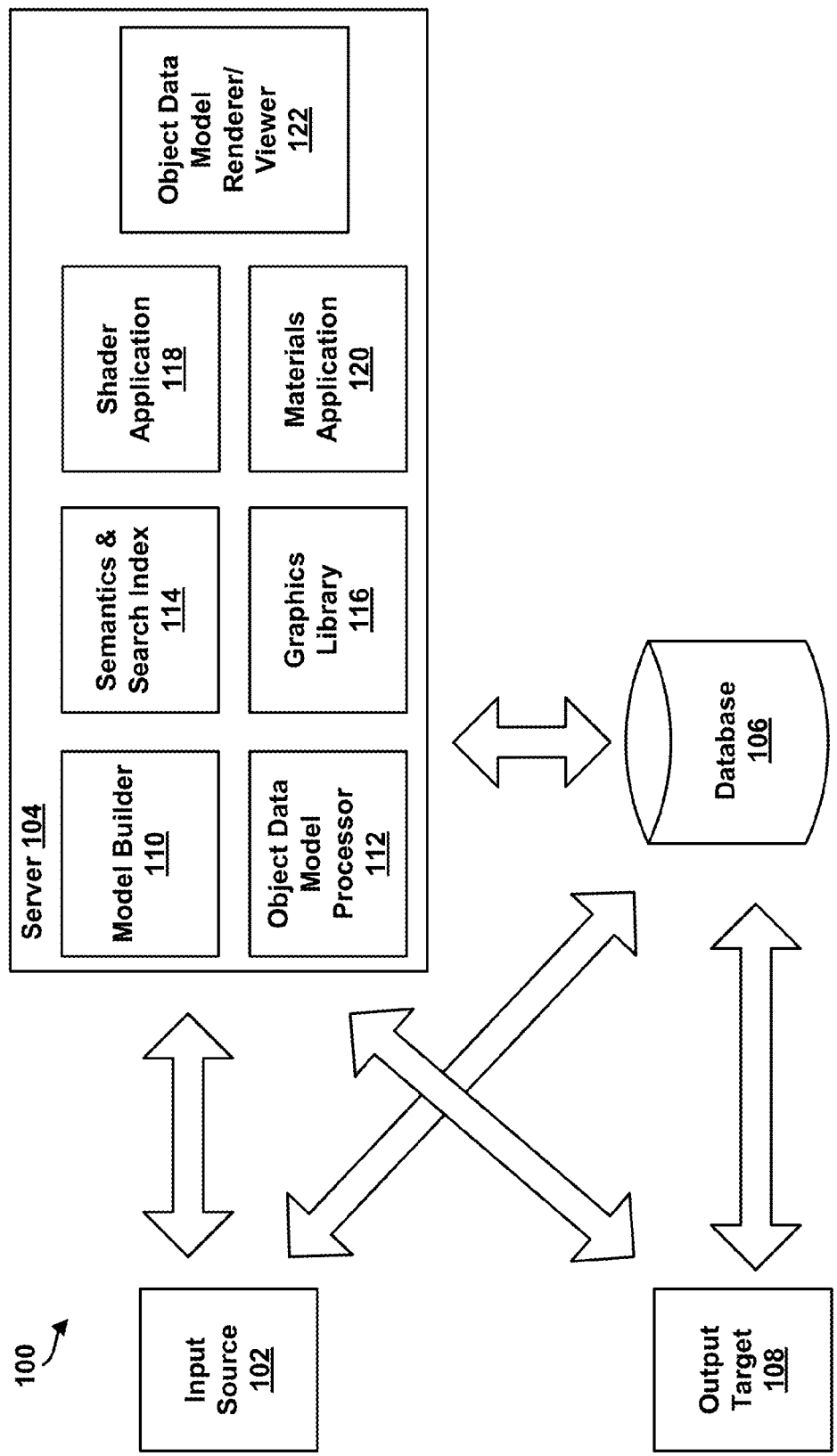
FIG. 1 illustrates an example system for object data modeling.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

The display of dynamic high-resolution 3D imagery is a feature found in online rich media applications. For example, an online store or advertisement may provide an interactive 3D viewer associated with a given product, and a 3D image or other 3D imagery of the given product can be shown in the 3D viewer. As another example, a search engine may provide such a viewer with a 3D image associated with a search query. Other examples are also possible.

When displaying high-resolution imagery over a network on a computing device, that computing device's bandwidth and other specifications can limit the level of resolution that can be displayed without introducing discernible delays. In some examples, a computing device with limited bandwidth may be able to quickly download data (e.g., a 3D object data model) associated with rendering low-resolution imagery, but not high-resolution imagery, and present (e.g., stream) that imagery to a user of the computing device with no discernible delay.

As such, disclosed herein are methods and systems for viewing dynamic high-resolution 3D imagery over a network. Such methods may be performed by a computing device so as to provide smooth, dynamic high-resolution imagery to a user without impeding interactivity while also providing high-resolution imagery when viewing statically. In some embodiments, the methods may be performed with existing browser technology rather than with plugins such as Flash. Other embodiments are possible as well.

An example system may be implemented in or take the form of one or more client/computing devices, such as mobile phones, tablet computers, laptop computers, wearable computing devices, televisions, or computing appliances, among others, or subsystems of such devices. Further, an example system may take the form of non-transitory computer readable medium, which has program instructions stored thereon that are executable by at a processor to provide the functionality described herein.

Referring now to the figures, FIG. 1 illustrates an example system 100 for object data modeling. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (e.g., a Wi-Fi network), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, a graphics library 116, a shader application 118, a materials application 120, and an object data model renderer/viewer 122. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate a combined model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets H that have colors but no UV (coordinate system of a 2D texture space) unwrapping to generate a mesh D with UV unwrapping but no colors. As an example, for a single output texture pixel of an image processing may include, for a given point in UV determine a triangle in the mesh's UV mapping D, and using triangle-local coordinates, move to an associated 3D point on the mesh. A bidirectional ray may be cast along the triangle's normal to intersect with the mesh H, and color, normal and displacement may be used for an output. To generate an entire texture image, each pixel in the image can be processed.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc. The semantics and search index 114 may receive the 3D object data model file or files comprising the 3D object data model from the model builder 110 or the object data model processor 112, and may be configured to label portions of the file or each file individually with identifiers related to attributes of the file.

In some examples, the semantics and search index 114 may be configured to provide annotations for aspects of the 3D object data models. For instance, an annotation may be provided to label or index aspects of color, texture, shape, appearance, description, function, etc., of an aspect of a 3D object data model. Annotations may be used to label any aspect of an image or 3D object data model, or to provide any type of information. Annotations may be performed manually or automatically. In examples herein, an annotated template of an object in a given classification or category may be generated that includes annotations, and the template may be applied to all objects in the given classification or category to apply the annotations to all objects.

The graphics library 116 may be configured to provide data in a form for display on a computing device. The graphics library 116 may have stored images associated with an object (i.e., 2D images), and the images together may comprise a 3D object data model. In some examples, the images together may comprise a video of the object, where each image is a frame of the video. In accordance with the methods described herein, the graphics library 116 may have stored low-resolution and high-resolution versions of the same images of a given object, with each low-resolution image having a corresponding high-resolution image of the same aspect or view of the given object.

In practice, a computing/client device may download the images from the graphics library 116 or the database 106 to be displayed (e.g., streamed) on the computing/client device in the 3D image viewer. The graphics library 116 may provide the images in a form where a 3D object data model can be rendered to generate a 3D image of the given object. The 3D image of the given object may be displayed on a browser, for example, such as in a 3D image viewer. In some examples, the graphics library 116 may include a WebGL or OpenGL mesh compression to reduce a mesh file size.

The shader application 118 may be configured to apply a shader to portions of the 3D object data model file or files of the 3D object data model according to the indexes of the file (as labeled by the semantics and search index 114) to generate a 3D image. The shader application 118 may be executed to apply a shader from a number of shaders according to the indexes of the file. The shader may include information related to texture, color, appearance, etc., of a portion of the 3D image.

In one example, the shader application 118 may be executed to render an image with shading attributes as defined by indexes of the files. For example, objects with multiple surfaces may have different attributes for each surface, and the shader application 118 may be executed to render each surface accordingly.

The materials application 120 may be configured to apply a material to portions of the 3D object data model file or to files of the 3D object data model according to the indexes of the file (as labeled by the semantics and search index 114) to generate a 3D image. The materials application 120 may be executed to apply a material from a number of materials according to the indexes of the file. The materials application may apply any material, such as leather, metal, wood, etc., so as to generate an appearance of a portion of the 3D image.

In one example, the materials application 120 may access a database that includes information regarding a number of reference materials (e.g., brass, fur, leather), and objects with multiple materials may be separated into distinct portions. As an example, a hood on a car may include a hood ornament, and the hood may be painted while the ornament may have a chrome finish. The materials application 120 and the shader application 118 can be executed to identify two separate materials (e.g., the painted hood and the chrome hood ornament) and render each material with an appropriate shader.

The object data model renderer/viewer 122 may receive the 3D object data model file or files and execute the shader application 118 and the materials application 120 to render the 3D object data model in order to generate a viewable 3D image. The object data model renderer/viewer 122 may be implemented using WebGL within a web browser, or OpenGL, for example.

The database 106 may store all data sets for a 3D object data model in any number of various forms from raw data captured to processed data for display.

The output target 108 may include a number of different targets, such as a webpage on the Internet, a search engine, a database, etc. The output target 108 may include a 3D image viewer that enables product advertisements or product searches based on the 3D image.

In examples herein, the system 100 may be used to acquire data of an object, process the data to determine a 3D object data model, and render the 3D object data model so as to generate a corresponding 3D image for display.

Figure 2:
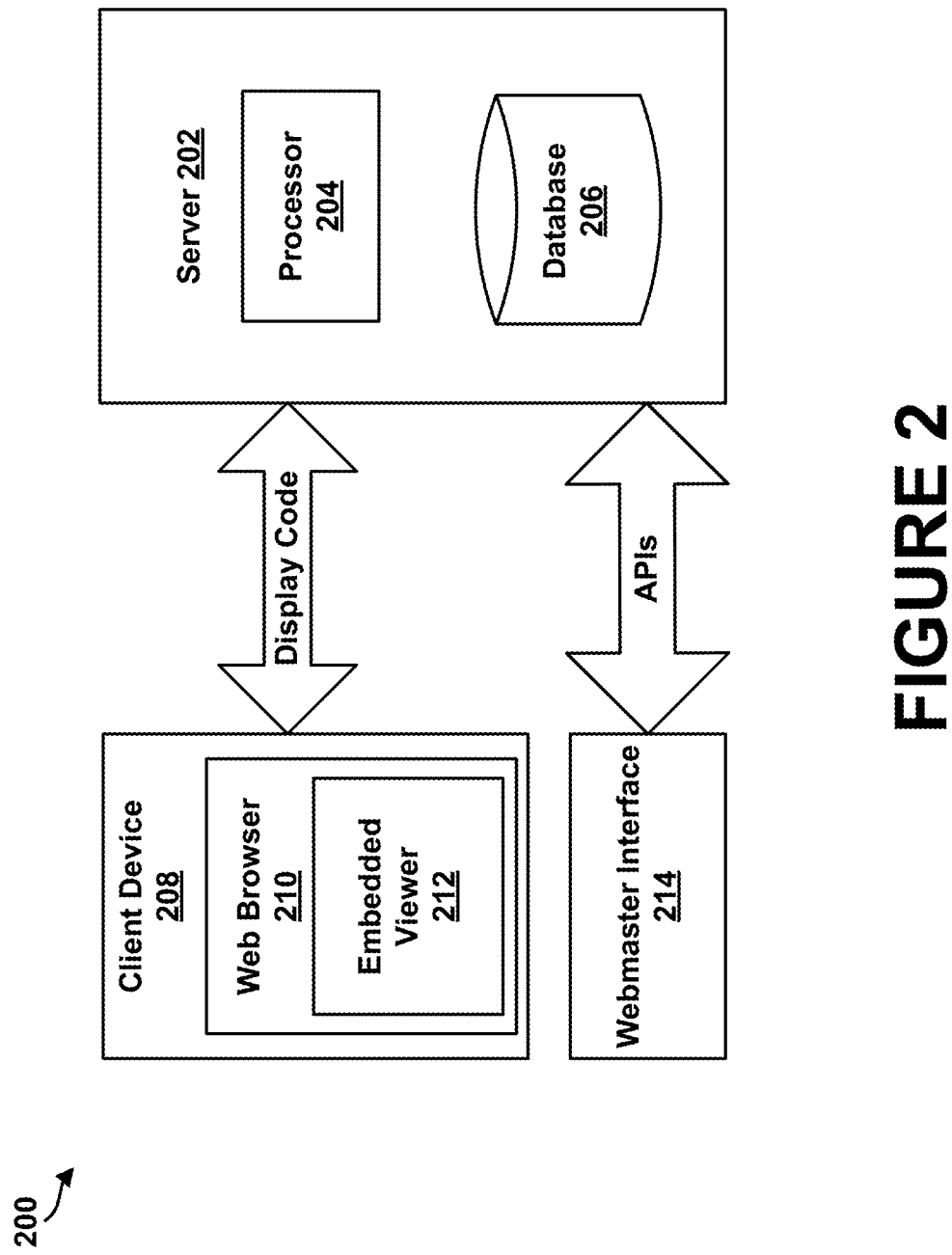
FIG. 2 illustrates an example system for providing a 3D image viewer.

FIG. 2 illustrates an example system 200 for providing a three-dimensional (3D) image viewer. The system may include a server 202 including a processor 204 and database 206. The server 202 may be configured to provide information associated with 3D object data models to one or more output targets. For example, the processor 204 may be coupled to the database 206, and the database 206 may include information associated with a plurality of 3D object data models. In one instance, the server 202 may be configured to serve a rendered 3D object data model and/or instructions for rendering a 3D object data model using graphics software such as WebGL, OpenGL ES, etc., to a client device 208 so as to generate a 3D image to be displayed by the client device 208. The 3D image may be a real-time, interactive 3D image in some instances.

In one example, WebGL may be used to render a 3D object data model within a web browser 210 on the client device 208. For example, based on information received from the server 202, the web browser 210 may display a webpage having an embedded viewer 212.

In some examples, the embedded viewer 212 may be embedded directly within a webpage with JavaScript or other scripting languages. For example, JavaScript may be used to render an iframe (or inline frame). In other examples, the embedded viewer 212 may be included within a webpage by pasting a block or section of HTML into code for the webpage. The block of HTML may describe information associated with parameters for customizing a 3D image viewer. For instance, the block of HTML may identify a 3D object data model to be accessed from the database 206 of the server 202.

The system 200 may also include a webmaster interface 214. In some examples, a user may configure parameters of the embedded viewer 212 using an application programming interface (API) and the webmaster interface 214. For example, the API may be a set of rules and specifications that a user can follow to communicate with the server 202. In one instance, the API may define vocabularies or function-calling conventions associated with the processor 204 and database 206. In another instance, the API may include specifications of routines, data structures, object classes, protocols, etc. to communication with software in the server 202 using language of the webpage (e.g., JavaScript). A user may select options for a 3D image viewer or input code within a template using the webmaster interface 214. Subsequently, a processor may generate code according to the API specifications that a user may paste into embedded language of a webpage. In some instances, the webmaster interface 214 may provide a high level interface (e.g., more simple) for controlling a 3D image rendered using complex graphics software (e.g., WebGL).

In some examples, the generated code may include HTML language referencing a version of the API and/or server hosting the API. In one example, the API may be a public API that is freely available. In other examples, the API may be licensed to authorized retailers for a fee. For example, retailers may wish to embed 3D image viewers within a webpage to display a 3D image of one or more of their products and seek a license to use the API.

Using the webmaster interface 214, a user may define parameters for customizing the embedded viewer 212 (e.g., size, background, user interface options, etc.) as well as parameters for customizing/controlling a rendering of a 3D object data model within the embedded viewer 212 (e.g., size, animation, camera angle, orientation, zoom level, color, texture, shading, overlays, etc.). In some examples, the user may be able to make a customized version of the embedded viewer 212 by coding a modified embedded viewer manually (e.g., without the user of the webmaster interface 214). This may allow the user to incorporate advanced features specific to a given type of embedded viewer.

In other examples, the webmaster interface 214 may facilitate providing an embedded viewer within a webpage by use of drag-and-drop functionality. For example, a user may select an embedded viewer type from the webmaster interface 214, drag the selected viewer onto code for the webpage, and drop the embedded viewer within the webpage code. In one instance, the webmaster interface 214 may be provided on a website. A user may select parameters associated with the embedded viewer via the website, and drag-and-drop a customized embedded viewer to a webpage. In a further example, the user may be prompted to provide parameters upon dropping an embedded viewer object onto code for a webpage. For example, the user may be prompted to input information about a size or color of the embedded viewer, a 3D object data model to be provided within the embedded viewer, a pose or other parameters associated with the 3D object data model, an animation sequence for a camera (such as a series of camera poses and corresponding time stamps) or the 3D object data model (such as a series of object poses and time stamps), etc., after dropping the embedded viewer into a block of code.

Thus, in some examples, the system 200 may enable a 3D image viewer to be provided within a webpage and controlled using high level API scripting.

In one example, a client device may be configured to request information associated with rendering a 3D object data model in a 3D image viewer from a server. For instance, the request may be determined or triggered based on a portion of embedded language provided within embedded language of a webpage.

The examples described herein relate to images of an object that are displayed in a 3D image viewer used to view a 3D image of the object. The 3D image viewer may be provided by a webpage loaded by the computing device, and the computing device may receive the images while loading the webpage or upon executing a request to load the webpage.

Figure 3:
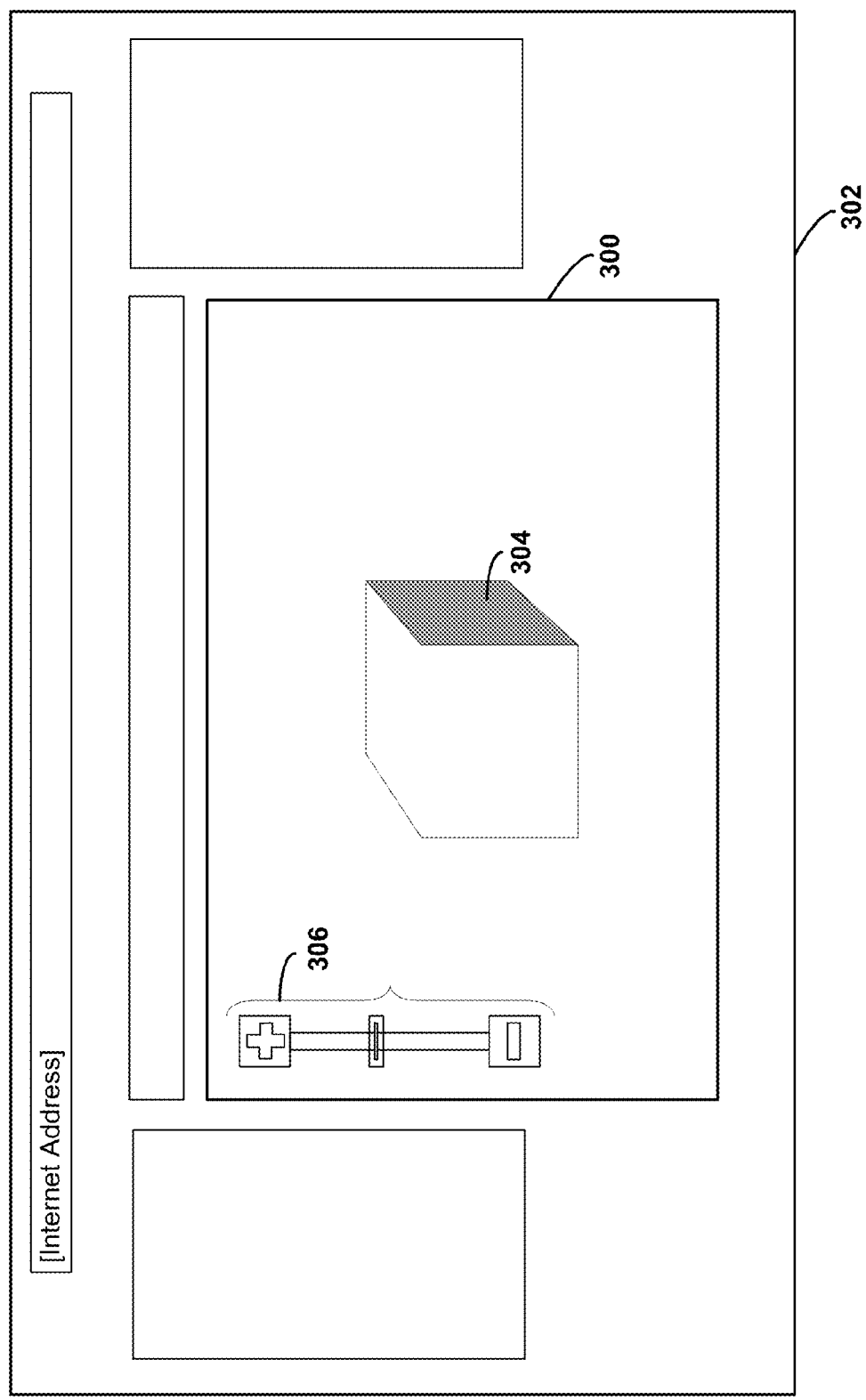
FIG. 3 illustrates an example display of a 3D image viewer.

FIG. 3 shows an example 3D image viewer 300 provided within a webpage 302. The webpage 302 may include miscellaneous information and content such as textual content, graphics, hyperlinks, etc. The 3D image viewer may be configured to render a 3D object data model of an object so as to generate a 3D image 304. In some examples, the 3D image viewer 300 may be configured to receive images, videos, and or other information associated with rendering the 3D object data model from a server to allow JavaScript or other scripting languages to generate the 3D image 304 of the object within the 3D image viewer.

In some examples, the 3D image viewer may be an interactive, real-time 3D image viewer, and the information associated with rendering the 3D object data model may be commands or function calls associated with WebGL, OpenGL ES, or other graphics software for rendering real-time, interactive 3D graphics. In other examples, the 3D image viewer may be a swivel viewer.

The 3D image 304 may be an interactive 3D graphic with which a user may interact in the 3D image viewer. For example, a user may pan, orbit, or zoom the 3D image 304 via an input device or method. As such, the 3D image viewer 300 may include a zooming tool 306 such that a user may be able to zoom in or out to focus on features or components of the 3D image 304 displayed in the 3D image viewer 300. In other instances, a user may zoom on components of the object by scrolling a wheel of a mouse or providing a gesture on a touchscreen. Other tools, capabilities, and functionalities are also possible.

In some examples, the parameters for the 3D image viewer and/or the 3D object data model may be input with reference to an application programming interface (API) (e.g., HTML5 video API). As such, a computing device displaying the webpage may load one or more libraries associated with the API to provide functionality. In some embodiments, HTML5 video encoding may be used.

Markup language defining the webpage, such as HTML, HTML5, and XML, among others, may include a portion of code associated with the 3D image viewer to be embedded within the webpage. For example, the 3D image viewer may be embedded within an inline frame (iframe) of HMTL language thus sandboxing the 3D image viewer from the webpage and thereby enabling the 3D image viewer to be modified on the webpage without requiring the entire webpage to be updated, so as to decrease latency for the webpage.

In some examples, the embedded language may define customization parameters for the 3D image viewer such as one or more embeddable buttons (such as buttons within the 3D image viewer that a user may click or select to cause a function). For instance, clicking an embeddable button may cause a 3D image within the 3D image viewer to spin or rotate. In another instance, an embeddable button may cause a 3D image to snap or transition to a predetermined camera position or object pose. In yet another instance, clicking an embeddable button may cause the 3D image viewer to zoom in on or zoom out from the 3D image. In other examples, the embedded language may define customization parameters for a 3D object data model to be rendered by the 3D image viewer. For instance, parameters may define a 3D pose, a camera position, a level of zoom, an animation sequence, an annotation for a component of the 3D object data model, a shader, a mesh resolution or size, etc., for the 3D object data model.

In some examples, the embedded language may describe when to load or render a 3D object data model within the 3D image viewer. For example, the 3D object data model may be rendered when the webpage is loaded. In one instance, a still two-dimensional image may be loaded initially as a placeholder/substitute for the 3D image while the 3D object data model loads. In some instances, the still image may take a fraction of a second to load, and may be replaced once the 3D object data model has loaded (e.g., after 3 seconds).

The still image may be an image that is rendered by a server based on the parameters associated with rendering the 3D object data model and sent to the webpage. For instance, if embedded language defines a background, level of zoom, and camera position for the 3D object data model, a 3D image of the 3D object data model having the appropriate background, level of zoom, and camera position may be rendered from the 3D object data model in the server and sent to the webpage of the client device. In other examples, the 3D object data model may be rendered when a user clicks on the embedded viewer or when a user scrolls down a webpage such that the embedded viewer is visible.

In a further instance, an indication may be provided when the 3D image has been loaded. For example, an animation sequence may begin when the 3D image has been loaded. As an example, the 3D image may rotate, hover, or wiggle, etc., after loading is complete.

In some examples, the location of the 3D image viewer may be defined within the embedded language by reserving a space in a web browser's document object model (DOM). The embedded language may also include instructions for controlling interactions with the 3D image. For example, JavaScript may define events based on user interface events such as a click, double-click, mouse up, mouse down, etc. over and/or near the 3D image. In one instance, clicking and dragging may enable a user to rotate the 3D image. It is also contemplated that the 3D image may be provided on other interfaces (e.g., touchscreen interfaces) and may be controlled with respect to input methods of the respective interfaces. Responses to any number of functionalities of the embedded 3D image viewer may also be defined within the embedded language.

Figure 4:
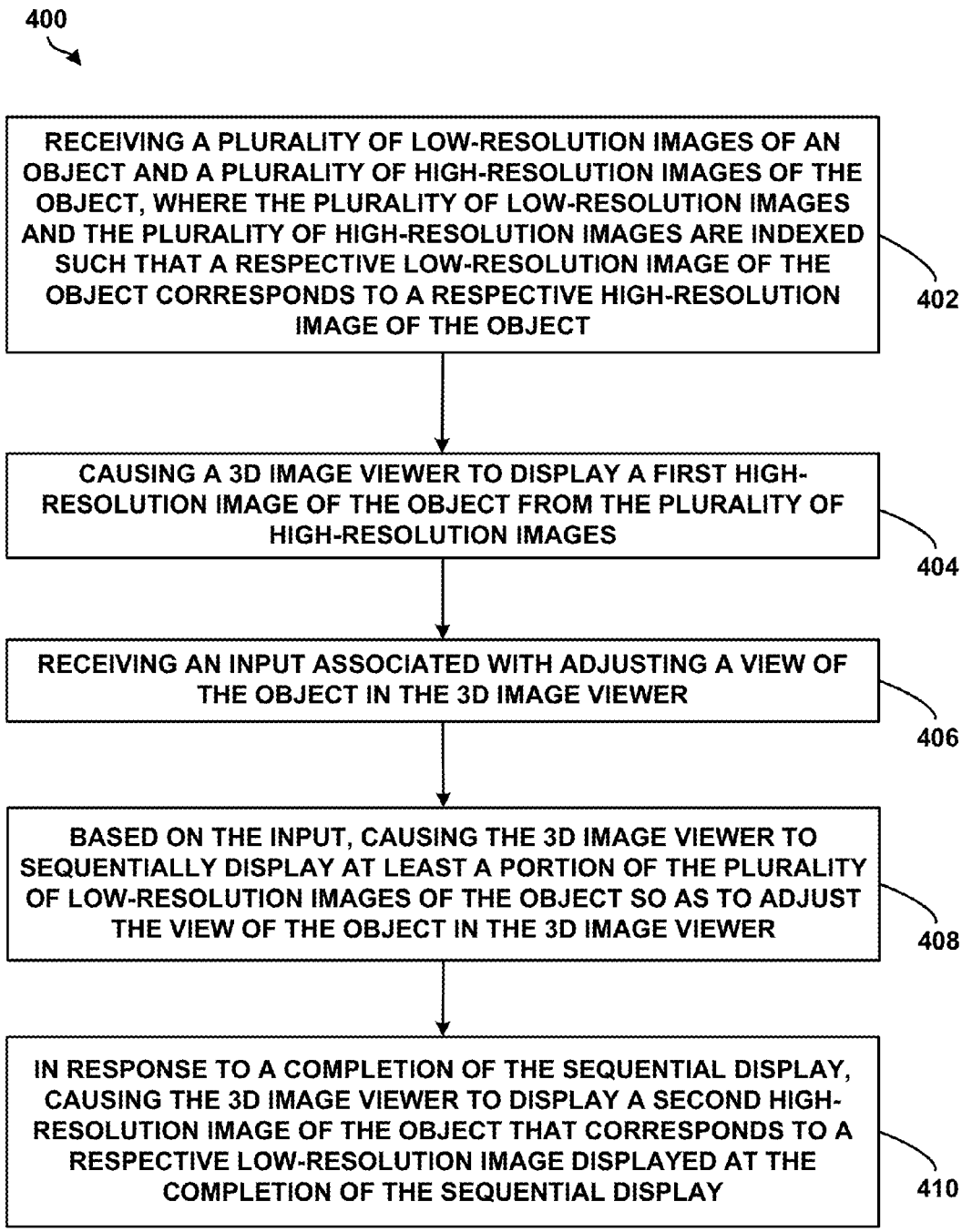
FIG. 4 is a block diagram of an example method.

FIG. 4 is a block diagram of an example method. Method 400 shown in FIG. 4 presents an embodiment of a method that could be used by the systems 100 or 200 of FIGS. 1-2 or components of the systems 100 or 200 such as the client device 208, for example. Method 400 may include one or more operations, functions, or actions as illustrated by one or more of blocks 402-410. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 400 and other processes and methods disclosed herein, each block in FIG. 4 may represent circuitry that is wired to perform the specific logical functions in the process.

Initially, at block 402, the method 400 includes receiving, at a computing device (e.g., client device 208), a plurality of low-resolution images of an object and a plurality of high-resolution images of the object (e.g., 2D images of the object), where the plurality of low-resolution images and the plurality of high-resolution images are indexed such that a respective low-resolution image of the object corresponds to a respective high-resolution image of the object. For instance, the plurality of low-resolution images of the object and the plurality of high-resolution images of the object may be associated with views of the object from predetermined positions around at least one axis of rotation of the object. As such, the object may be viewable in a 3D image viewer from 360 degree paths (e.g., a horizontal rotation around the object and/or a vertical rotation over the top and bottom of the object), or other, more complex paths around the object. Further, the images may be indexed such that a given low-resolution image of the object associated with a given view corresponds to a given high-resolution image of the object associated with the given view. The low and high resolution images may then be used to render low and high resolution versions of a 3D object data model.

The computing device may receive the images based on a capability level of the computing device. The capability level may be determined by the computing device itself or by other computing devices (e.g., server 202). In some examples, the capability level may include a bandwidth associated with the computing device. For instance, the bandwidth associated with the computing device may include storage bandwidths, mobile telephone interface bandwidths, computer bus bandwidths, DRAM bandwidths, and/or digital audio bandwidths, among other possibilities. Additionally or alternatively, the capability level may include a screen resolution of the computing device, processing capabilities of the computing device, one or more APIs associated with a web browser of the computing device, and/or other examples of capability level not described herein. In some examples, the computing device receiving the images may be further based on a capability level of a wired and/or wireless network (e.g., PAN, WPAN, LAN, WAN, etc.) in which the computing device is operating. The capability level may also include bandwidths or other parameters associated with the communication links noted above with respect to FIG. 1.

In some examples, the computing device receiving the images may be based on a comparison of the capability level (of the computing device and/or of other network components/devices) with a predetermined performance threshold. For instance, if the capability level does not meet the performance threshold, the computing device may receive at least a portion of the low-resolutions before receiving one or more of the high-resolution images. In such an instance, the computing device may be able to download and display low-resolution images of the object without discernible delay while waiting for at least a portion of the high-resolution images to be downloaded, thus allowing a user to more quickly begin interacting with the 3D image provided in the 3D image viewer. In other instances, when the capability level does not meet the performance threshold, instructions for rendering the 3D object data model may be altered. For example, the 3D image viewer may be replaced by a swivel viewer, rather than an interactive, real-time 3D image viewer.

At block 404, the method 400 includes causing a 3D image viewer to display a first high-resolution image of the object from the plurality of high-resolution images. In some examples, upon receiving a request to provide a 3D image for display in the 3D image viewer, the computing device may receive at least a portion of the high-resolution images of the object and display one of the high-resolution images of the object (e.g., the first high-resolution images, as noted above) while the computing device receives the low-resolution images of the object and receives at least another portion of the high-resolution images of the object. In some examples, the first high-resolution image may be a predetermined "default" image to be displayed as a representation of the object.

In some examples, while the 3D image viewer is displaying the first high-resolution image of the object and while the computing device is receiving the plurality of low-resolution images, the computing device may cause the 3D image viewer to ignore inputs from a user of the computing device. Such inputs may be representative of requests to adjust a view of the 3D image in the 3D image viewer or otherwise interact with the 3D image in the 3D image viewer. When the user provides inputs while the computing device is receiving the plurality of low-resolution images, the 3D image viewer may continue to display the first high-resolution image in response to the inputs. In addition, the computing device may provide for display a notification indicative of the receiving of the plurality of low-resolution images of the object. For example, the notification may take the form of a progress bar or a "Loading" symbol/message. Other examples are also possible.

In some examples, once the computing device completes its receiving of the plurality of low-resolution images, the computing device may receive from a server or other device that provides the low-resolution images an indication of a completion of the receiving. In some embodiments, the indication of the completion may not be provided until all of the plurality of low-resolution images has been received, but it is also possible that, in other embodiments, the indication may be provided once the computing device has received a portion of the plurality of low-resolution images. In response to receiving the indication, the computing device may then cause the 3D image viewer to provide for display a notification indicative of the completion. For instance, the notification may take the form of an animation of the 3D image (e.g., an "animation sequence," as noted above). The animation may take the form of a 360 degree rotation of the 3D image about an axis of rotation of the 3D image. The notification may take other forms as well. After displaying the notification indicative of the completion, the computing device may enable the 3D image viewer to begin receiving inputs from the user.

As such, at block 406, the method involves receiving an input associated with adjusting a view of the object in the 3D image viewer (i.e., adjusting a view of the 3D image representation of the object). As discussed above, the input may include a request to zoom in on the 3D image, a request to zoom out from the 3D image, a request to provide an alternate view of the 3D image, and a request to rotate the 3D image around at least one axis of rotation of the object. Other inputs for adjusting a view of the 3D image or otherwise interacting with the 3D image are possible as well.

At block 408, the method involves, based on the input, causing the 3D image viewer to sequentially display at least a portion of the plurality of low-resolution images of the object so as to adjust the view of the object in the 3D image viewer. By way of example, if the input provided by a user of the computing device is a request to rotate the 3D image 90 degrees from the 3D image's default position about a horizontal axis of the 3D image, the computing device may cause the 3D image viewer to sequentially display a portion of the low-resolution images of the object so as to simulate the 90-degree rotation of the 3D image about a horizontal axis of the 3D image. As such, the final image of the sequence that is displayed may be a 90-degree rotated view of the object. Further, the images that are sequentially displayed between the first image and the final image are displayed at a high rate so that the user perceives the rotation of the 3D image to be a smooth rotation with little or no discernible delay. Other examples are also possible.

In some examples, the portion of low-resolution and/or high-resolution images that are displayed as part of the sequential display may be based on various factors, such as a size of the display of the computing device, a speed of the input (e.g., a user clicking on the 3D image and moving the 3D image quickly with a mouse or other input device), and a zoom level of the 3D image in the 3D image viewer (e.g., high-resolution images may be used for views that are zoomed in and/or out past a given threshold). Other factors are possible as well.

At block 410, the method involves, in response to a completion of the sequential display, causing the 3D image viewer to display a second high-resolution image of the object that corresponds to a respective low-resolution image displayed at the completion of the sequential display. As such, when the 3D image is not being interacted with by the user, the user may view the 3D image in high-resolution rather than in low-resolution. While the 3D image is being interacted with, however, as described with respect to block 408, the interaction may be simulated with a sequence of low-resolution images of the object (e.g., a low-resolution version of the 3D image). Accordingly, when the sequence of low-resolution images is completed, a high-resolution image of the object that corresponds to the final low-resolution image of the sequence may be displayed immediately.

In some examples, the method 400 with respect to blocks 404-410 may be performed while the computing device is receiving a remainder of the plurality of high-resolution images of the object (i.e., while the rest of the high-resolution images are downloaded/buffered). When the computing device has received the entire plurality of high-resolution images, the computing device may receive an indication of a completion of the receiving. Then, rather than the computing device causing the 3D image viewer to sequentially display at least a portion of the plurality of low-resolution images to simulate an interaction with the 3D image, the computing device may cause the 3D image viewer to sequentially display at least a portion of the plurality of high-resolution images to simulate that same interaction. In other examples, a combination of both low-resolution imagery and high-resolution imagery may still be used after the computing device has received the plurality of high-resolution images. Other examples are possible as well.

In some examples, due to the similarity between adjacent frames in a sequence of images, using a delta-encoding format like video may achieve higher compression than when treating all imagery separately. Accordingly, video compression and decompression techniques may be used to reduce a data transmission size of the images that make up the 3D object data model. By way of example, at least a portion of the plurality of low-resolution images may be combined into at least one low-resolution video and the low-resolution video may be compressed using any number of video compression techniques. Likewise, at least a portion of the plurality of high-resolution images may be combined into at least one high-resolution video and the high-resolution video may be compressed using any number of video compression techniques. As such, the low-resolution images may comprise frames of the low-resolution video, and the high-resolution images may comprise frames of the high-resolution video.

In some examples, the video compressions may be lossy or lossless, and may operate on square blocks of neighboring pixels, or macroblocks. For instance, a video compression codec may send only the difference within the macroblocks between images or frames of the video. Other types of video compression and codecs are also possible.

The compressed video may then be received by the computing device. The computing device may use native decompression video techniques (e.g., decompression techniques commonly found within web browsers for streaming video) to decompress the video. Subsequently, images representative of multiple views of the object may be recovered and identified as individual images.

In some examples, a server may have stored a high-resolution video and a low-resolution video, but the high-resolution video may not be automatically buffered upon initiation of the 3D image viewer. A particular frame of the high-resolution video may be initially displayed once the computing device has received the low-resolution video, and when an interaction with the 3D image begins, the computing device may cause the 3D image viewer to sequentially display frames of the low-resolution video (e.g., "play" at least a portion of the low-resolution video) so as to simulate the interaction with the 3D image. In some examples, the frames of the low-resolution video may be displayed at a frame rate of about 30-60 frames per second.

Once the interaction is completed, the high-resolution video seeks to the desired frame that corresponds to the last low-resolution frame of the sequential display, and the desired high-resolution frame replaces the last low-resolution frame. In some examples, the desired high-resolution frame may be displayed immediately, while in other examples, the last low-resolution frame may fade into the desired high-resolution frame. In some examples, the input to interact with the 3D image may be a request to skip to a given frame of the low-resolution video, in which case the computing device may cause the 3D image viewer to display a respective frame of the high-resolution video that corresponds to the given frame of the low-resolution video.

In some examples, at least a portion of the high-resolution video may be buffered before the interaction and/or during the interaction, while one or more other portions of the high-resolution video may be buffered after the interaction when those one or more other portions are not displayed to simulate the interaction, but may need to be displayed to simulate other interactions.

In some examples, the computing device may implement a combination of video-based encoding and image-based encoding. For example, the low-resolution images may be provided as a video, and individual high-resolution images may be provided for the desired frames. As such, in some scenarios when a high resolution video is received, individual high-resolution images could also be received to facilitate close zooming or panning in the 3D image (and/or video) viewer. Further, the high-resolution images may be associated with frame locations specified by callouts or thumbnails in the user interface. In some examples, low-resolution images may be sent to facilitate smooth interaction with the 3D image, and high-resolution images can be provided as part of a high-resolution video to take advantage of streaming and delta encoding. Other examples are also possible.

FIGS. 5A-5E each show an example display of a swivel viewer 500. It should be understood that the functions performed with respect to the swivel viewer 500 may be performed, additionally or alternatively, by another type of 3D image viewer, such as a real-time, interactive 3D image viewer, that is configured similarly to or differently from the swivel viewer 500.

The swivel viewer 500 may be configured to display an image 502 of an object. In some examples, the image 502 may be an image captured from a rendering of the 3D object data model having a front camera position. In some examples, a user may click or otherwise input a modification to the swivel viewer to cause other images of the object to be displayed. For instance, the other images may be images of the object rendered from separate positions around an axis of rotation of the object. In one example, a user may click and drag to the left or right to cause the image 502 displayed by the swivel viewer 500 to change. In another example, a user may perform a gesture (e.g., a swipe) on a touchscreen interface to cause the image 502 displayed by the swivel viewer 500 to be replaced by a different image.

Additionally, the swivel viewer 500 includes multiple snapshots 504 a user may select to cause the image 502 displayed by the swivel viewer 500 to rotate to a given image. For instance, the snapshots 504 may include a perspective, front, right, back, left, top, and bottom view images. In one example, a user may select a top snapshot, and the image 502 may fade out. Subsequently, an image generated based on a rendering of the 3D object data model from a top camera position may fade in. In another example, a user may select a right snapshot, and the image displayed by the swivel viewer may animate through a number of images captured between the front and right of the 3D object data model before displaying an image generated based on a rendering of the 3D object model from a right camera position. For instance, if the right snapshot is an image captured at 90 degrees and the image 502 displayed by the swivel viewer 500 is an image captured at 0 degrees, the swivel viewer 500 may sequentially display image at camera positions between 0 degrees and 90 degrees (e.g., 5 degrees, 10 degrees, 15 degrees . . . 85 degrees).

In one example implementation, 74 images of a 3D object data model may be rendered by a server or by a computing device. For example, images of the 3D object data model may be generated from 72 predetermined positions covering 360 degrees around the 3D object data model. The images may, for instance, be captured at 5 degree increments (i.e., 0 degrees, 5 degrees, 10 degrees . . . 355 degrees). Additionally, a 73rd and 74th image may be generated for a top and bottom of the 3D object data model by rendering the 3D object data model having a top and bottom camera position. The computing device may then display the images via the swivel viewer 500. Other example numbers of images and predetermined positions are also possible, and the example is not meant to be limiting. For instance, the swivel viewer 500 may be modified to also include images captured at predetermined positions around multiple axes/arcs of rotation of the object.

As discussed above, in some embodiments, the images of the 3D object data model may comprise a video that is compressed by a server and provided to the computing device. The computing device may use native decompression video techniques (e.g., decompression techniques commonly found within web browsers for streaming video) to decompress the video. Subsequently, the rendered images from the multiple views of the 3D object data model may be recovered and identified as individual images, and the computing device may store the individual images within a memory of the computing device that can be retrieved by the swivel viewer 500 for display.

In other examples, the images recovered by the swivel viewer 500 may be caused to be sequentially displayed in the swivel viewer 500. For instance, the swivel viewer 500 may display each of the images briefly such that the 3D object data model appears to have rotated 360 degrees. In some examples, images recovered from the video may be progressively displayed as the images are recovered. For instance, as an image is recovered, the rendered image may be displayed by the swivel viewer 500. In some instances, multiple rendered images of the video may be displayed before the entire video has been received by the swivel viewer 500.

In some examples, the first group of images recovered by the swivel viewer 500 may be low-resolution images of the object. In such examples, a server may render a second group of images having a higher resolution that the first group of images. For example, the second group of images may be rendered based on a 3D object data model that is rendered having a higher zoom level, more detailed geometry, and/or more detailed material information. The second group of images may also be images captured at the same predetermined positions around the axis of rotation of the 3D object data model as the first group of images. As such, the first and second groups of images may be indexed such that a respective low-resolution image corresponds to a respective high-resolution image. For instance, each pairing of low- and high-resolution images may include the same view of the object. Additionally, in some examples, the second group of images may be combined into a video, compressed by the server, and provided to the computing device.

As such, the computing device may decompress the video of the high-resolution images and recover the individual higher resolution images. In some examples, the high-resolution compressed video may be received after the low-resolution video is received, and the recovered high-resolution images may replace the first stored individual low-resolution images. For instance, if the swivel viewer 500 is caused to display another image of the 3D object data model after the second video has been received, the swivel viewer 500 may display a high-resolution image captured based on the same predetermined view as an originally stored image instead of displaying the original, low-resolution image for that viewpoint. In some examples, providing the high-resolution images in the swivel viewer 500 may provide higher quality images of the 3D object data model that can be zoomed in on and optionally panned by a user without a discernible decrease in image quality or resolution. For instance, an image of the first group may be visibly pixelated when zoomed in on. However, a high-resolution image recovered from the second video may not be visibly pixelated when zoomed in on.

Figure 5A:
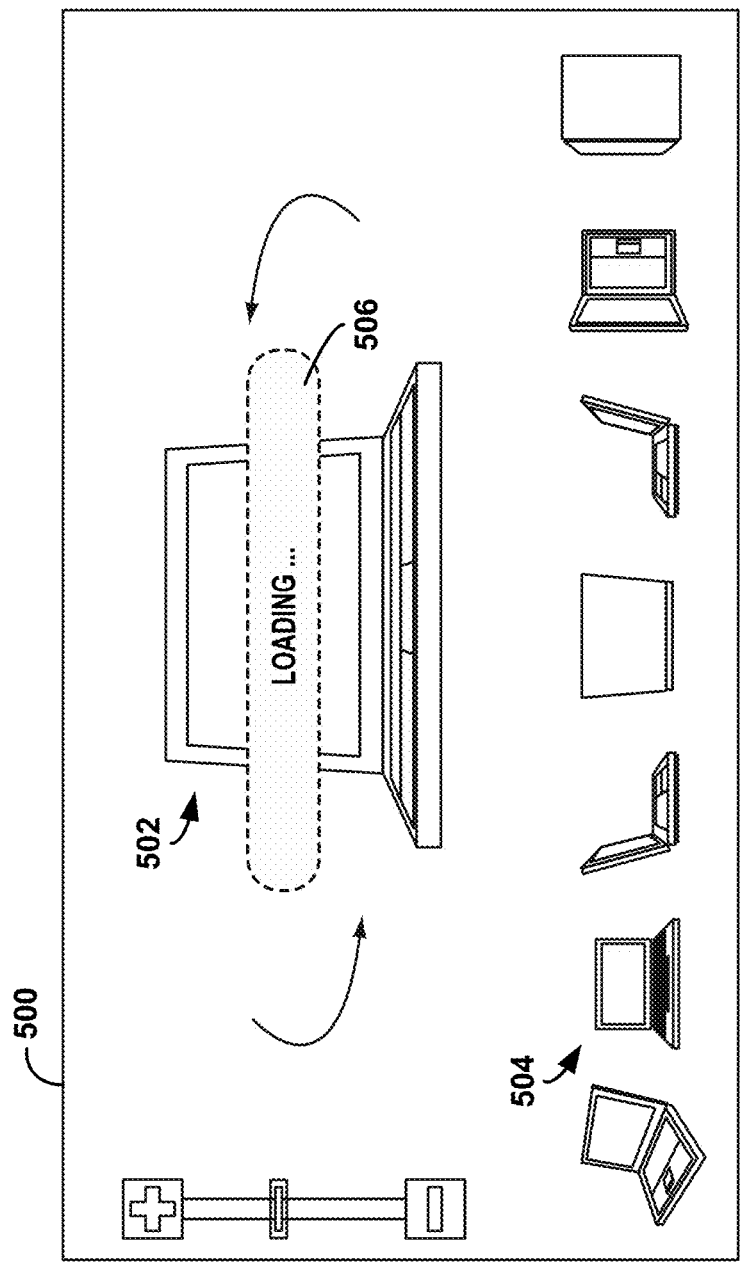
FIGS. 5A-5E illustrate example implementations of the example method.

Further, the method 400 of FIG. 4 can be performed when a computing device receives low-resolution images of the object and corresponding high-resolution images of the object. FIGS. 5A-5E illustrate example implementations of the method 400. As shown in FIG. 5A, when the swivel viewer 500 has been initiated and the computing device is receiving the plurality of low-resolution images, the swivel viewer 500 may display a "Loading" message 506 over the image 502 and ignore any user inputs to the swivel viewer 500 until the plurality of low-resolution images have been received. The image 502 may be a low-resolution image or a high-resolution image.

Figure 5B:
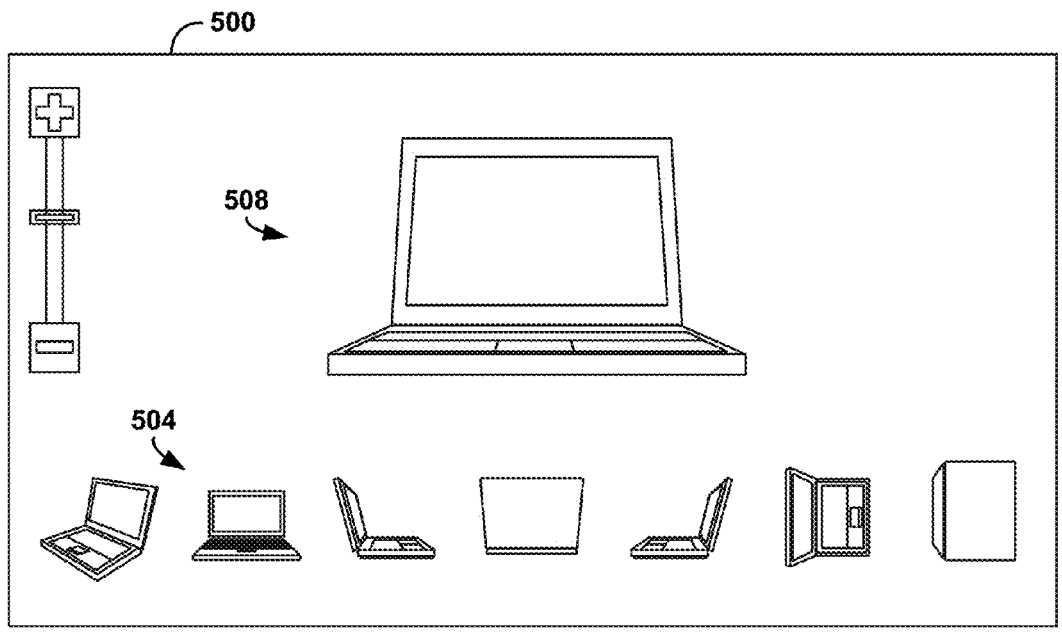
Figure 5C:
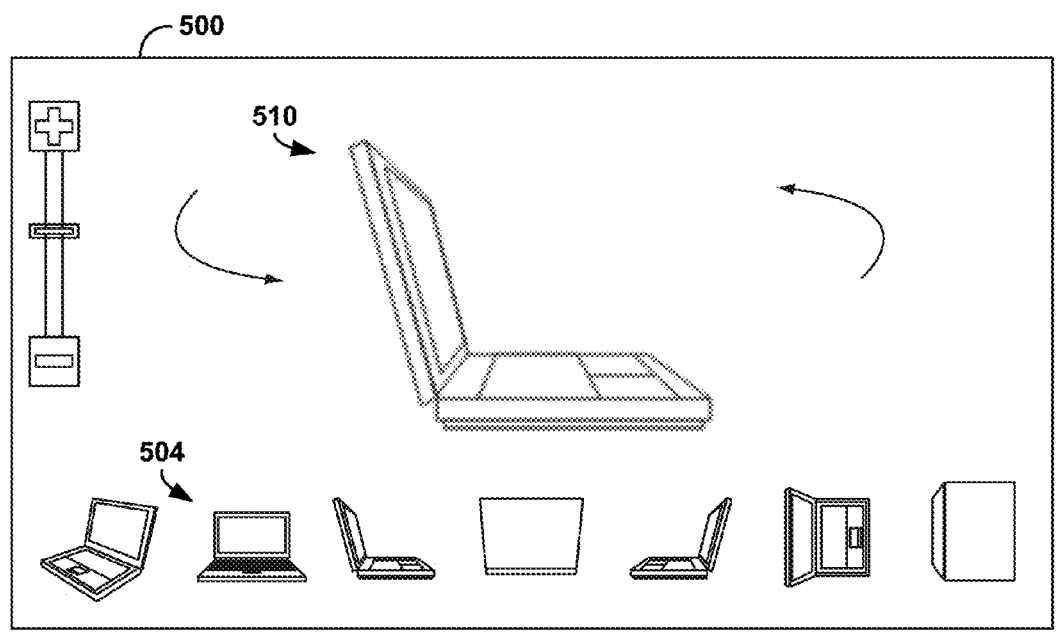
Figure 5D:
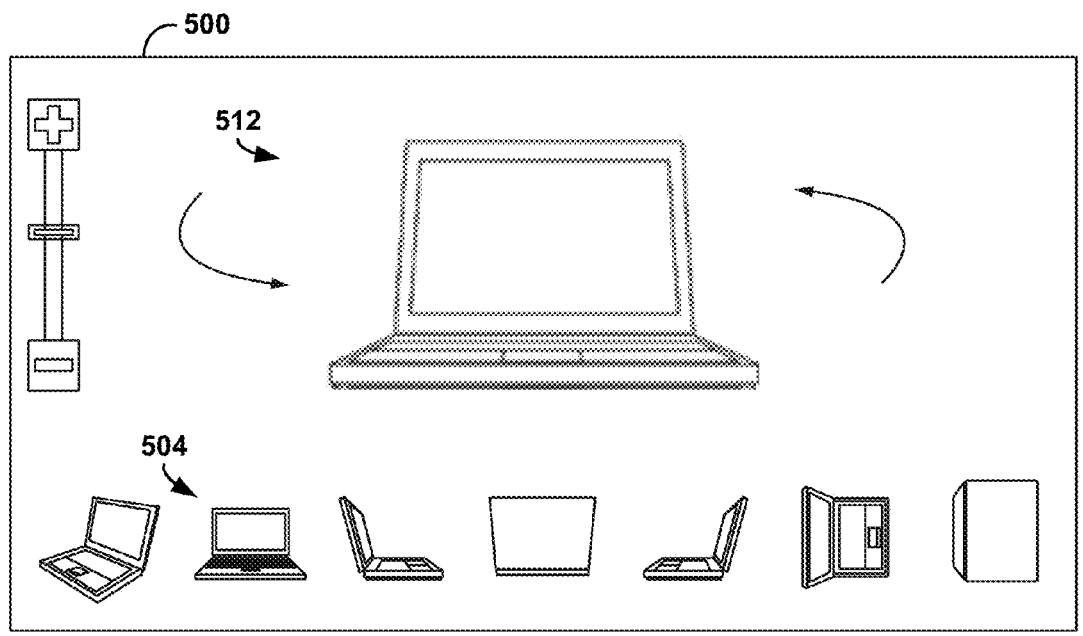
Figure 5E:
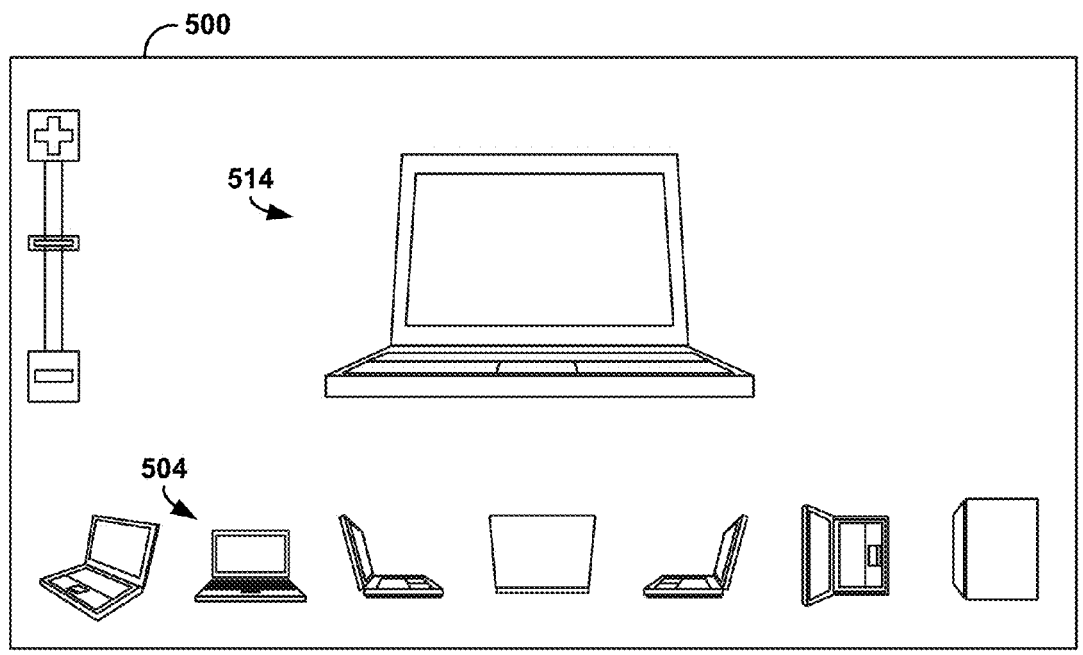

After the plurality of low-resolution images has been received, the swivel viewer 500 may display a first high-resolution image 508 of the object, as shown in FIG. 5B. Next, the user may input a request to adjust a view of the image 508, such as a request to rotate the image 360 degrees about a vertical axis of the image. Upon receiving the request, the computing device may then cause the swivel viewer 500 to sequentially display low-resolution images in order to simulate the rotation of the image (e.g., display 30-60 images per second). For instance, as shown in FIG. 5C, among the many images that the swivel viewer 500 displays as part of the sequential display, the swivel viewer 500 may briefly display a low-resolution image 510 of the object depicting a 90-degree rotated view of the object. And, as shown in FIG. 5D, the swivel viewer 500 may display a final low-resolution image 512 of the object depicting about a 360-degree rotated view of the object at the end of the sequential display. Then, as shown in FIG. 5E, once the sequential display has been completed, the computing device may cause the swivel viewer 500 to display a particular high-resolution image 514 that corresponds with the final low-resolution image 512. Other implementations of the example method 400 are possible as well.

In some examples, the computing device (e.g., the 3D image viewer) may be configured to interpolate between two views of a 3D image. For instance, with video, the computing device may implement motion-compensated frame interpolation (MCFI) video processing in order to generate intermediate frames based on existing frames (e.g., images) that are stored at the server or stored in memory at the computing device. High-resolution images/frames may be displayed while the user is not interacting with the 3D image, and low-resolution images/frames may be displayed during user interactivity with the 3D image, and the computing device may use interpolation to fill in gaps between displayed low-resolution images and displayed high-resolution images in order to make the transitions from low-to-high resolution and high-to-low resolution smooth and fluid and reduce discernibility of the transitions.

Figure 6:
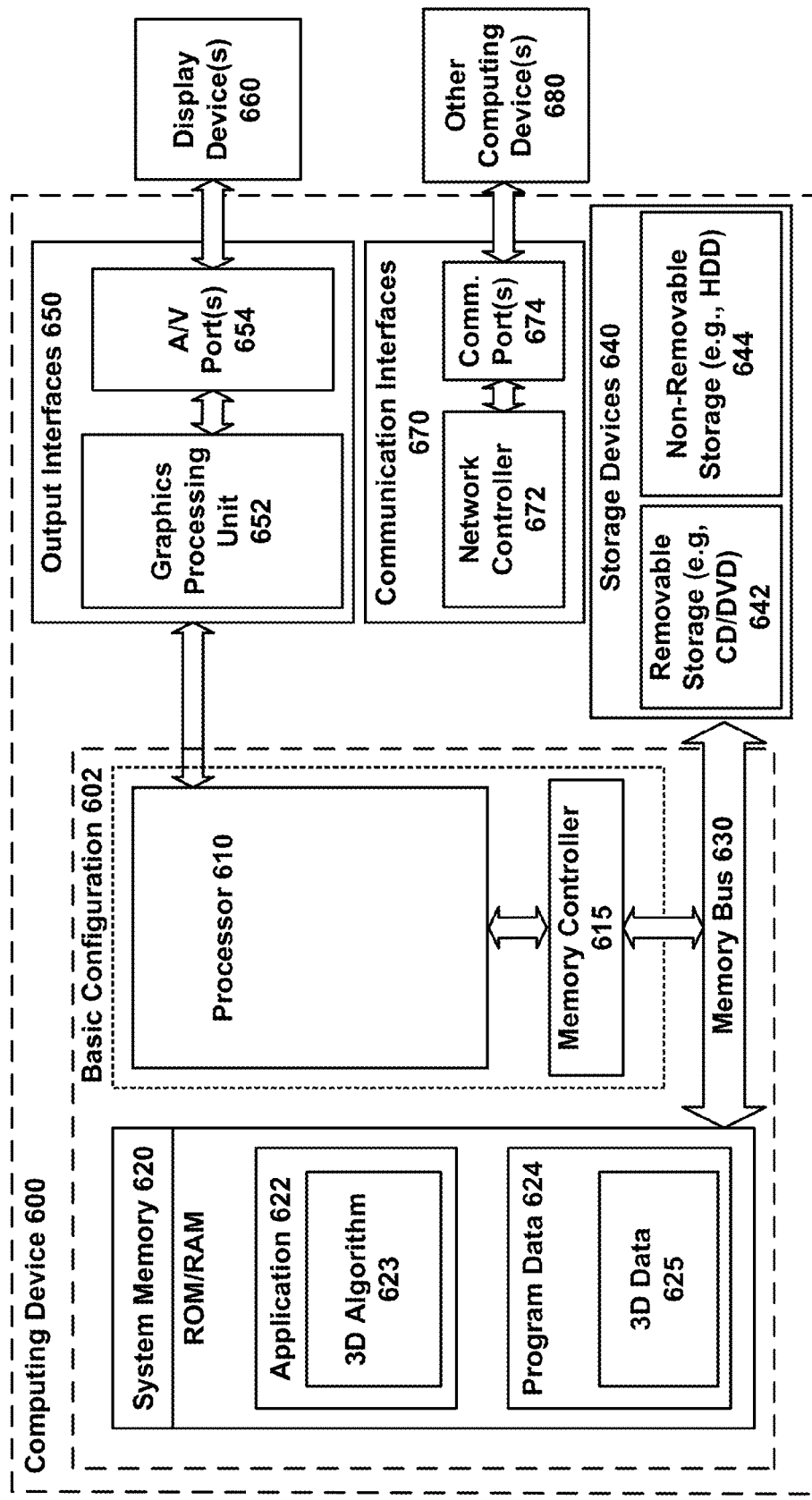
FIG. 6 is a functional block diagram illustrating an example computing device used in a computing system that is arranged in accordance with at least some embodiments described herein.

FIG. 6 is a functional block diagram illustrating an example computing device 600 used in a computing system that is arranged in accordance with at least some embodiments described herein. The computing device 600 may be a personal computer, mobile device, cellular phone, touch-sensitive wristwatch, tablet computer, video game system, or global positioning system, and may be implemented to provide a system for viewing dynamic high-resolution 3D imagery over a network, as described above. In a basic configuration 602, computing device 600 may typically include one or more processors 610 and system memory 620. A memory bus 630 can be used for communicating between the processor 610 and the system memory 620. Depending on the desired configuration, processor 610 can be of any type including but not limited to a microprocessor (µP), a microcontroller (µC), a digital signal processor (DSP), or any combination thereof. A memory controller 615 can also be used with the processor 610, or in some implementations, the memory controller 615 can be an internal part of the processor 610.

Depending on the desired configuration, the system memory 620 can be of any type including but not limited to volatile memory (such as RAM), non-volatile memory (such as ROM, flash memory, etc.) or any combination thereof. System memory 620 may include one or more applications 622, and program data 624. Application 622 may include a 3D algorithm 623 that is arranged to provide inputs to the electronic circuits, in accordance with the present disclosure. Program data 624 may include 3D information 625 that could be directed to any number of types of data. In some example embodiments, application 622 can be arranged to operate with program data 624 on an operating system.

Computing device 600 can have additional features or functionality, and additional interfaces to facilitate communications between the basic configuration 602 and any devices and interfaces. For example, data storage devices 640 can be provided including removable storage devices 642, non-removable storage devices 644, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 620 and storage devices 640 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of device 600.

Computing device 600 can also include output interfaces 650 that may include a graphics processing unit 652, which can be configured to communicate to various external devices such as display devices 660 or speakers via one or more A/V ports 654 or a communication interface 670. The communication interface 670 may include a network controller 672, which can be arranged to facilitate communications with one or more other computing devices 680 over a network communication via one or more communication ports 674. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 can also be implemented as a personal computer including both laptop computer and non-laptop computer configurations.

In some embodiments, the disclosed methods may be implemented as computer program instructions encoded on a non-transitory computer-readable storage media in a machine-readable format, or on other non-transitory media or articles of manufacture. FIG. 7 is a schematic illustrating a conceptual partial view of an example computer program product 700 that includes a computer program for executing a computer process on a computing device, arranged according to at least some embodiments presented herein.

In one embodiment, the example computer program product 700 is provided using a signal bearing medium 701. The signal bearing medium 701 may include one or more programming instructions 702 that, when executed by one or more processors may provide functionality or portions of the functionality described above with respect to FIGS. 1-6. In some examples, the signal bearing medium 701 may encompass a computer-readable medium 703, such as, but not limited to, a hard disk drive, a Compact Disc (CD), a Digital Video Disk (DVD), a digital tape, memory, etc. In some implementations, the signal bearing medium 701 may encompass a computer recordable medium 704, such as, but not limited to, memory, read/write (R/W) CDs, R/W DVDs, etc. In some implementations, the signal bearing medium 701 may encompass a communications medium 705, such as, but not limited to, a digital and/or an analog communication medium (e.g., a fiber optic cable, a waveguide, a wired communications link, a wireless communication link, etc.). Thus, for example, the signal bearing medium 701 may be conveyed by a wireless form of the communications medium 705 (e.g., a wireless communications medium conforming with the IEEE 802.11 standard or other transmission protocol).

The one or more programming instructions 702 may be, for example, computer executable and/or logic implemented instructions. In some examples, a computing device such as the computing device 600 of FIG. 6 may be configured to provide various operations, functions, or actions in response to the programming instructions 702 conveyed to the computing device 600 by one or more of the computer readable medium 703, the computer recordable medium 704, and/or the communications medium 705.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
   receiving, at a computing device, a plurality of low-resolution images of an object and a plurality of high-resolution images of the object, wherein the plurality of low-resolution images and the plurality of high-resolution images are indexed such that a respective low-resolution image of the object corresponds to a respective high-resolution image of the object;
   before a completion of the receiving of the plurality of high-resolution images of the object:
      causing a 3D image viewer to display a first high-resolution image of the object from the plurality of high-resolution images,
      receiving an input associated with adjusting a view of the object in the 3D image viewer,
      based on the input, causing the 3D image viewer to sequentially display at least a portion of the plurality of low-resolution images of the object so as to adjust the view of the object in the 3D image viewer, and
      in response to a completion of the sequential display of at least the portion of the plurality of low-resolution images of the object, causing the 3D image viewer to display a second high-resolution image of the object that corresponds to a respective low-resolution image displayed at the completion of the sequential display;
   receiving, at the computing device, an indication of the completion of receiving the plurality of high-resolution images of the object;
   receiving another input associated with adjusting a view of the object in the 3D image viewer;
   based on the another input and the indication of the completion of receiving the plurality of high-resolution images of the object, causing the 3D image viewer to sequentially display at least a portion of the plurality of high-resolution images of the object so as to adjust the view of the object in the 3D image viewer; and
   in response to a completion of the sequential display of at least the portion of the plurality of high-resolution images of the object, causing the 3D image viewer to display another given high-resolution image of the object.

2. The method of claim 1, wherein the plurality of low-resolution images of the object and the plurality of high-resolution images of the object are associated with views of the object from predetermined positions around at least one axis of rotation of the object, and
   wherein a given low-resolution image of the object associated with a given view corresponds to a given high-resolution image of the object associated with the given view.

3. The method of claim 1, further comprising:
   while receiving the plurality of low-resolution images of the object:
      receiving inputs associated with adjusting views of the object in the 3D image viewer;
      causing the 3D image viewer to display the first high-resolution image in response to the inputs; and
      the computing device providing for display a notification indicative of the receiving of the plurality of low-resolution images of the object.

4. The method of claim 1, further comprising:
   receiving, at the computing device, an indication of a completion of the receiving of the plurality of low-resolution images of the object; and
   in response to receiving the indication, causing the 3D image viewer to provide for display an animation of the object so as to indicate that the receiving of the plurality of low-resolution images of the object has been completed.

5. The method of claim 1, further comprising:
   determining a capability level of the computing device,
   wherein the capability level includes one or more of a bandwidth associated with the computing device and a screen resolution of the computing device, and
   wherein the receiving of the plurality of low-resolution images of the object and the receiving of the plurality of high-resolution images of the object are based on a comparison of the capability level of the computing device with a performance threshold.

6. The method of claim 1, wherein the input includes one or more of: a request to zoom in on the object, a request to zoom out from the object, a request to provide an alternate view of the object, and a request to rotate the object around at least one axis of rotation of the object.

7. A non-transitory computer-readable medium having stored therein instructions, that when executed by a computing device, cause the computing device to perform functions comprising:
   receiving a plurality of low-resolution images of an object and a plurality of high-resolution images of the object, wherein the plurality of low-resolution images and the plurality of high-resolution images are indexed such that a respective low-resolution image of the object corresponds to a respective high-resolution image of the object;
   before a completion of the receiving of the plurality of high-resolution images of the object:
      causing a 3D image viewer to display a first high-resolution image of the object from the plurality of high-resolution images,
      receiving an input associated with adjusting a view of the object in the 3D image viewer,
      based on the input, causing the 3D image viewer to sequentially display at least a portion of the plurality of low-resolution images of the object so as to adjust the view of the object in the 3D image viewer, and
      in response to a completion of the sequential display of at least the portion of the plurality of low-resolution images of the object, causing the 3D image viewer to display a second high-resolution image of the object that corresponds to a respective low-resolution image displayed at the completion of the sequential display;
   receiving, at the computing device, an indication of the completion of receiving the plurality of high-resolution images of the object;
   receiving another input associated with adjusting a view of the object in the 3D image viewer;
   based on the another input and the indication of the completion of receiving the plurality of high-resolution images of the object, causing the 3D image viewer to sequentially display at least a portion of the plurality of high-resolution images of the object so as to adjust the view of the object in the 3D image viewer; and
   in response to a completion of the sequential display of at least the portion of the plurality of high-resolution images of the object, causing the 3D image viewer to display another given high-resolution image of the object.

8. The non-transitory computer-readable medium of claim 7, wherein the plurality of low-resolution images of the object comprise a low-resolution 3D object data model of the object, and wherein the plurality of high-resolution images of the object comprise a high-resolution 3D object data model of the object.

9. The non-transitory computer-readable medium of claim 7, wherein the plurality of low-resolution images of the object comprises at least one low-resolution video, and wherein the plurality of high-resolution images of the object comprises at least one high-resolution video.

10. The non-transitory computer-readable medium of claim 9, wherein causing the 3D image viewer to sequentially display at least the portion of the plurality of low-resolution images comprises causing the 3D image viewer to play a given low-resolution video of the at least one low-resolution video.

11. The non-transitory computer-readable medium of claim 9, wherein the plurality of low-resolution images of the object comprises frames of the at least one low-resolution video, wherein the plurality of high-resolution images of the object comprises frames of the at least one high-resolution video, and wherein the input is a request to skip to a given frame of the at least one low-resolution video that corresponds to a respective frame of the at least one high-resolution video.

12. The non-transitory computer-readable medium of claim 7, wherein at least the portion of the plurality of low-resolution images of the object is sequentially displayed at a frame rate of about 30-60 frames per second.

13. A system, comprising:
at least one processor; and
data storage comprising instructions executable by the at least one processor to cause the system to perform functions comprising:
  receiving a plurality of low-resolution images of an object and a plurality of high-resolution images of the object, wherein the plurality of low-resolution images and the plurality of high-resolution images are indexed such that a respective low-resolution image of the object corresponds to a respective high-resolution image of the object,
  before a completion of the receiving of the plurality of high-resolution images of the object:
    causing a 3D image viewer to display a first high-resolution image of the object from the plurality of high-resolution images,
    receiving an input associated with adjusting a view of the object in the 3D image viewer,
    based on the input, causing the 3D image viewer to sequentially display at least a portion of the plurality of low-resolution images of the object so as to adjust the view of the object in the 3D image viewer, and
    in response to a completion of the sequential display of at least the portion of the plurality of low-resolution images of the object, causing the 3D image viewer to display a second high-resolution image of the object that corresponds to a respective low-resolution image displayed at the completion of the sequential display;
  receiving, at the computing device, an indication of the completion of receiving the plurality of high-resolution images of the object;
  receiving another input associated with adjusting a view of the object in the 3D image viewer;
  based on the another input and the indication of the completion of receiving the plurality of high-resolution images of the object, causing the 3D image viewer to sequentially display at least a portion of the plurality of high-resolution images of the object so as to adjust the view of the object in the 3D image viewer; and
  in response to a completion of the sequential display of at least the portion of the plurality of high-resolution images of the object, causing the 3D image viewer to display another given high-resolution image of the object.

14. The system of claim 13, the functions further comprising:
providing a webpage, wherein the webpage includes the 3D image viewer.

15. The system of claim 13, wherein the 3D image viewer includes a swivel viewer.

16. The system of claim 13, wherein the 3D image viewer includes an interactive real-time 3D image viewer.

17. The system of claim 13, wherein the plurality of low-resolution images of the object and the plurality of high-resolution images of the object are associated with views of the object from predetermined positions around at least one axis of rotation of the object, and
wherein a given low-resolution image of the object associated with a given view corresponds to a given high-resolution image of the object associated with the given view.

18. The system of claim 13, the functions further comprising:
receiving an indication of a completion of the receiving of the plurality of low-resolution images of the object; and
in response to receiving the indication, causing the 3D image viewer to provide for display an animation of the object so as to indicate that the receiving of the plurality of low-resolution images of the object has been completed, wherein the animation includes about a 360 degree rotation of the object around an axis of rotation of the object.

* * * * *